United States Patent Office 3,275,569
Patented Sept. 27, 1966

3,275,569
LOWER VALENT TITANIUM-ALUMINIUM HALIDES
Robert Holroyd Stanley, Stockton-on-Tees, and Derek Howden, Nunthorpe, England, assignors to British Titan Products Company Limited, Durham, England, a company of the United Kingdom
No Drawing. Filed Jan. 18, 1963, Ser. No. 252,313
Claims priority, application Great Britain, Jan. 23, 1962, 2,448/62
12 Claims. (Cl. 252—442)

The present invention relates to a process for the production of mixtures or compounds containing titanium having a valency lower than 4, and in particular to mixture or compounds of this type wherein the titanium is present as a halide. The mixtures or compounds also contain an aluminium halide.

Lower halides of titanium in which the valency of titanium is less than 4, for example titanium trichloride, are commonly present together with an aluminium halide in polymerisation catalysts of the Ziegler/Natta-type, which are widely used in the polymerisation of unsaturated hydrocarbon compounds such as olefins, for example ethylene or propylene.

These compounds, i.e. lower halides of titanium and halides of aluminium, are also of value as additives to the vapour phase oxidation of a titanium tetrahalide to produce pigmentary titanium dioxide, since they act as agents for nucleating the titanium dioxide formed and ensure that the pigmentary product is predominantly rutile.

The production of lower halides of titanium and aluminium halides by the reduction of a tetrahalide with aluminium has been previously described, particularly in relation to the production of Ziegler/Natta-type catalysts. Various methods of carrying out this reduction have been disclosed, for example:

(a) Heating together aluminium and titanium tetrachloride at a temperature of about 200° C.
(b) Heating together aluminium and titanium tetrachloride in a liquid hydrocarbon at a temperature in the range of about 80° C. to 180° C. for long periods.
(c) Ball milling aluminium and titanium tetrachloride together for prolonged periods at a temperature in the range of about 20° C. to 100° C.

These methods have the disadvantage that they are time consuming and/or require special equipment.

It is an object of the present invention to provide a process for the production of mixtures or compounds containing a lower halide of titanium and an aluminium halide.

It is also an object of the invention to provide such a mixture or compound which shows activity when used as a component of a Ziegler/Natta-type catalyst.

Accordingly, the present invention comprises reducing a titanium tetrahalide with aluminium in the presence of hydrogen halide.

The titanium tetrahalide is preferably titanium tetrachloride and the hydrogen halide is preferably hydrogen chloride, although other tetrahalides and hydrogen halides may be used if desired, particularly if a liquid solvent or diluent is used to provide a liquid reaction mixture. For example, the use of titanium tetraiodide and titanium tetrabromide and hydrogen iodide and hydrogen bromide are contemplated.

The amount of tetrahalide used is preferably at least sufficient to react with all the aluminium present, i.e. at least a stoichiometric amount of the tetrahalide; indeed, it is advantageous to use an excess of the tetrahalide in order to ensure that no free aluminium remains in the reaction product, since this may be undesirable.

The reaction may be carried out if desired in the presence of an added liquid diluent, for example a liquid aromatic hydrocarbon such as benzene, toluene, or xylene. Under these circumstances the reaction may take place without heating, usually after a short induction period.

When using other liquid diluents, for example liquid aliphatic hydrocarbons, such as heptane, or halogenated hydrocarbons, such as tetrachlorethylene or chlorobenzene or ortho-dichloro-benzene, it may be preferable to heat the reaction mixture. The temperature to which the reaction mixture is heated may vary depending upon the diluent used, but a generally convenient method is to heat the reaction mixture to its boiling point under reflux until the reaction starts.

Alternatively, when the tetrahalide is a liquid, as in the case of titanium tetrachloride, excess of this may be used to provide a liquid reaction mixture. It is also preferred to heat the reaction mixture in this case.

Since the reaction is exothermic it is normally carried out under reflux to prevent loss of any tetrahalide and/or diluent as the reaction proceeds.

In the preferred method, the reaction is carried out in the presence of excess titanium tetrahalide or other liquid diluent. This decreases the violence of the reaction. The product is a slurry from which a brown or purple/brown solid may be obtained, for example by filtration or distillation and by drying of the residue.

Since the lower halides of titanium are reactive in the presence of oxygen or moisture the reaction and recovery are advantageously carried out in the absence of oxygen and moisture, for example under an atmosphere inert to the reaction mixture, such as nitrogen or argon.

A convenient method of introducing the hydrogen halide (particularly when the reaction mixture is to be heated, for example under reflux) is to pass the hydrogen halide into the reaction mixture, either continuously or intermittently, during the period of heating.

Excess hydrogen halide may be used in the present process since the lower halide of titanium formed, for example titanium trichloride, is not reconverted to titanium tetrahalide by excess hydrogen halide.

It is, of course, preferred that the aluminium be present in a finely-divided form to ensure the most rapid and complete reaction.

If it is desired to use the product of the reaction as a component of a Ziegler/Natta-type catalyst, the dry material may be recovered, for example as described above and used in a known manner as a catalyst component. For example, it may be milled, suitably by either dry ball milling or ball milling in a liquid vehicle. Where a liquid vehicle is used this is preferably the liquid in which the polymerisation process is to be carried out. After milling, the product may be introduced into a polymerisation vessel and the other component of the catalyst may then be introduced into the vessel followed by the unsaturated hydrocarbon that is to be polymerised. The other component of the catalyst is suitably an organo-metallic compound such as an aluminium alkyl or aluminium alkyl halide and in particular in aluminium trialkyl or triaryl, e.g. triethyl aluminium, tripropyl aluminium, tri-n-butyl aluminium, or triphenyl aluminium. Alkyl or aryl compounds of other metals in Groups 1 to 3 of the Periodic Table may be used, if desired.

If it is desired to use the product of this invention in the vapour phase oxidation of a titanium tetrahalide, this may be done, for example, by reacting a calculated proportion of aluminium with excess titanium tetrahalide in the presence of the hydrogen halide and using the product as a feed or as an addition to the feed to the vapour phase oxidation reactor. Under such circumstances both the aluminium halide and the lower halide of titanium present in the mixture form nucleating agents for the titanium dioxide formed during the oxidation process and ensure that the titanium dioxide produced is predominantly rutile.

The following examples describe methods of carrying out the process of the present invention.

*Example 1*

A flask fitted with a reflux condenser was filled with argon. To this flask were added 9 g. aluminium powder (having a mean particle diameter of about 0.5μ), 121 ml. redistilled titanium tetrachloride and 200 ml. dry benzene. Dry hydrogen chloride was then bubbled slowly through the reaction mixture. After 4 hours (during which no appreciable reaction occurred) a violent reaction took place with the evolution of heat and the liquid constituents of the mixture boiled in the flask under reflux.

A purple/brown slurry formed in the flask. Hydrogen chloride was passed through this for another 6 hours, apparently without further reaction. The slurry was filtered under argon. The precipitate was washed with benzene and dried under reduced pressure for 6 hours.

The product was a brown solid.

This product was ball milled for 48 hours in dry n-heptane to form a slurry. A quantity of the slurry equivalent to 8.75 millimoles titanium was introduced into a flask containing further n-heptane under argon. 17.5 millimoles triethyl aluminium were then introduced into the flask. The temperature of the reaction mixture was maintained at 50° C. and propylene was passed through the mixture for 3 hours, after which 55.5 g. solid polypropylene was recovered.

The catalytic activity of the product of the invention was therefore 50.4 moles propylene per mole titanium per hour.

*Example 2*

A flask with a reflux condenser was filled with argon. To this flask were added 9 g. aluminium powder (having a mean particle diameter of about 0.5μ) and 330 ml. titanium tetrachloride; no other liquid diluent was added. The contents of the flask were heated to 100° C. and maintained at that temperature.

Hydrogen chloride was then slowly bubbled through the contents of the flask, which continued to be heated to 100° C. After about 2 hours a reaction was seen to commence and it proceeded smoothly for about 22 hours, when it appeared to be complete. A purple/brown slurry was formed. It was filtered off under argon and washed with benzene. The precipitate was dried under reduced pressure for 6 hours.

The product was a purple/brown solid.

As a contrast to Example 2, a similar experiment was carried out, but in the absence of hydrogen chloride. After 22 hours, no visible reaction had occurred although the contents of the flask did become slightly coloured.

*Example 3*

A flask with a reflux condenser was filled with argon. To this flask was added 9 g. aluminium powder, 121 ml. redistilled titanium tetrachloride and 200 ml. orthodichlorobenzene as a diluent.

The reaction mixture was heated to 100° C. and maintained at this temperature and hydrogen chloride was passed through the mixture for about 1 hr. when a violent reaction took place and a brown solid formed.

The slurry was filtered under argon, washed with benzene and a brown solid was obtained which was dried under reduced pressure.

*Example 4*

The process described in Example 3 was repeated using 200 ml. n-heptane instead of ortho-dichlorobenzene.

The reaction, which was not violent, began 3 hours after the commencement of the introduction of the hydrogen chloride and proceeded smoothly for about 16 hours.

The product was a brown/purple solid.

In a similar experiment carried out in the absence of hydrogen chloride no reaction had occurred after 16 hours.

*Example 5*

The process described in Example 3 was repeated using 200 ml. tetrachloroethylene instead of ortho-dichlorobenzene.

Three hours after the start of the introduction of hydrogen chloride, a slow reaction began which appeared to be complete after 19 hours.

A dark purple solid was obtained.

In a similar experiment carried out in the absence of hydrogen chloride no reaction occurred after 19 hours.

*Example 6*

The process described in Example 3 was repeated using 4.6 g. aluminium powder, 208 g. titanium *tetrabromide* and 200 ml. benzene in place of the reactants in Example 3. The reaction began 1½ hours after the commencement of the introduction of hydrogen chloride and some heat was evolved. The reaction proceeded for 12 hours.

A dark purple solid was obtained.

The catalytic activity of the product was estimated by ball milling a quantity of the product for 48 hours in n-heptane. A quantity of the resulting slurry equivalent to 11.1 millimoles titanium was introduced into a flask containing n-heptane under argon. 22.2 millimoles triethyl aluminium were then introduced into the flask and the reaction mixture was maintained at 50° C. Propylene was then passed in for 3 hours and 34 g. polypropylene was precipitated and recovered.

The catalytic activity of the product of the example was therefore 24.3 moles propylene per mole titanium per hour.

*Example 7*

The process described in Example 3 was repeated using 3.9 g. aluminium powder, 178 g. titanium tetrabromide and 200 ml. benzene instead of the reactants in Example 3.

Dry *hydrogen bromide* (in place of hydrogen chloride) was then passed through the mixture and 2½ hours after the start of the passage of hydrogen bromide a reaction began and some heat was evolved. This reaction continued for 12 hours.

A dark brown product was obtained.

In Examples 5, 6 and 7 the product before recovery was washed with the diluent used in the process and not with benzene as in Example 3.

What is claimed is:

1. In the reaction in a liquid reaction medium of a titanium tetrahalide and aluminum metal to produce a lower valent titanium-aluminium halide composition, the improvement comprising initiating said reaction in the reactive presence of a hydrogen halide.

2. A process according to claim 1 in which the tetrahalide is liquid and an excess of it is used to maintain a liquid reaction medium in the reaction chamber.

3. A process according to claim 1 in which a liquid diluent other than the tetrahalide is introduced into the reaction chamber so as to provide a liquid reaction medium.

4. A process according to claim 3 in which the liquid diluent is a hydrocarbon.

5. A process according to claim 4 in which said hydrocarbon is selected from the group consisting of benzene, toluene, xylene, heptane, chlorobenzene, dichlorobenzene and tetrachloroethylene.

6. A process for the production of material containing aluminium chloride and lower chloride of titanium, comprising introducing into a reaction vessel aluminium metal, an amount of liquid titanium tetrachloride which is in excess of the amount required to react with all the aluminium metal, and hydrogen chloride, these three reactants being intimately intermingled, reacting the aluminium metal with the titanium tetrachloride in the presence of the hydrogen chloride to produce aluminium chloride and lower chloride of titanium, and recovering from the reaction vessel material containing aluminium chloride and lower chloride of titanium.

7. A process according to claim 6 in which there is also introduced into the reaction vessel to provide a liquid reaction medium therein a liquid hydrocarbon diluent.

8. A process according to claim 6 in which the liquid hydrocarbon diluent is selected from the group consisting of benzene, toluene, xylene, heptane, chlorobenzene, dichlorobenzene and tetrachloroethylene.

9. A process according to claim 6 in which the hydrogen chloride is added to a mixture of the aluminium metal and the titanium tetrachloride while the mixture is being heated at reaction temperature.

10. A process according to claim 9 in which the addition is stopped substantially immediately upon commencement of reaction of the aluminium metal and the titanium tetrachloride.

11. A process according to claim 1 in which the hydrogen halide is added a mixture of the aluminium and the titanium tetrahalide while the mixture is being heated at reaction temperature.

12. A process according to claim 11 in which the addition is stopped substantially immediately upon commencement of the reaction between the aluminium and the titanium tetrahalide.

References Cited by the Examiner

UNITED STATES PATENTS

| | | | |
|---|---|---|---|
| 2,760,880 | 8/1956 | Grove | 106—300 |
| 2,760,938 | 8/1956 | Dempster et al. | 252—372 |
| 2,773,042 | 12/1956 | Hendriks | 252—372 |
| 2,780,558 | 2/1957 | Wilcox | 106—300 |
| 3,008,943 | 11/1961 | Guyer | 260—93.7 |
| 3,009,907 | 11/1961 | Mahlman et al. | 260—93.7 |
| 3,017,401 | 1/1962 | Bo et al. | |
| 3,031,440 | 4/1962 | Kaufman et al. | |
| 3,032,390 | 5/1962 | Caunt | 23—51 |

OSCAR R. VERTIZ, *Primary Examiner.*

TOBIAS E. LEVOW, EDWARD STERN, *Examiners.*

J. POER, *Assistant Examiner.*